United States Patent
Drexel et al.

(10) Patent No.: US 11,458,454 B2
(45) Date of Patent: Oct. 4, 2022

(54) GRANULAR FUNCTIONALIZED SILICA, PROCESS FOR PREPARATION THEREOF AND USE THEREOF

(71) Applicants: Claus-Peter Drexel, Neu-Isenburg (DE); Jürgen Meyer, Stockstadt (DE); Frank Heindl, Rodenbach (DE); Evonik Degussa GmbH, Essen (DE)

(72) Inventors: Claus-Peter Drexel, Neu-Isenburg (DE); Jürgen Meyer, Stockstadt (DE); Frank Heindl, Rodenbach (DE)

(73) Assignee: Evonik Operations GmbH, Essen (DE)

( * ) Notice: Subject to any disclaimer, the term of this patent is extended or adjusted under 35 U.S.C. 154(b) by 1660 days.

(21) Appl. No.: 14/410,385

(22) PCT Filed: Jun. 12, 2013

(86) PCT No.: PCT/EP2013/062166
§ 371 (c)(1),
(2) Date: Oct. 21, 2015

(87) PCT Pub. No.: WO2014/001088
PCT Pub. Date: Jan. 3, 2014

(65) Prior Publication Data
US 2016/0082415 A1    Mar. 24, 2016

(30) Foreign Application Priority Data
Jun. 28, 2012 (DE) .................... 10 2012 211 121.2

(51) Int. Cl.
B01J 20/28 (2006.01)
B01J 20/30 (2006.01)
(Continued)

(52) U.S. Cl.
CPC ....... B01J 20/28073 (2013.01); B01J 20/103 (2013.01); B01J 20/22 (2013.01);
(Continued)

(58) Field of Classification Search
CPC .......... C01B 33/12; C01B 33/18; B01J 20/22; B01J 20/3007; B01J 20/3028;
(Continued)

(56) References Cited

U.S. PATENT DOCUMENTS 5,665,156 A    9/1997  Ettlinger et al.
5,711,797 A    1/1998  Ettlinger et al.
(Continued)

FOREIGN PATENT DOCUMENTS

DE    10163179    7/2003
EP    0725037    8/1996
(Continued)

OTHER PUBLICATIONS

WO2011117100—Drexel et al—see machine translation, Sep. 2011 (Year: 2011).*

(Continued)

Primary Examiner — Smita S Patel
(74) Attorney, Agent, or Firm — Michael Best & Friedrich LLP

(57) ABSTRACT

The present invention relates to granular functionalized silicas, wherein
the Hg pore volume (<4 μm) is more than 0.80 ml/g,
$d_{Q3=10\%}$ is more than 400 μm,
$d_{Q3=90\%}$ is less than 3000 μm,
the ratio of $d_{50}$ without ultrasound exposure to $d_{50}$ after 3 min of ultrasound exposure is <4.00 and
the carbon content is 1.0-15.0% by weight.
The inventive granular functionalized silicas can be used as a support material, especially as a support for enzymes.

6 Claims, 2 Drawing Sheets

(51) Int. Cl.
*B01J 20/32* (2006.01)
*C09C 1/30* (2006.01)
*B01J 20/10* (2006.01)
*C01B 33/18* (2006.01)
*B01J 20/22* (2006.01)
*B01J 31/02* (2006.01)

(52) U.S. Cl.
CPC ... *B01J 20/28004* (2013.01); *B01J 20/28011* (2013.01); *B01J 20/28057* (2013.01); *B01J 20/28069* (2013.01); *B01J 20/3007* (2013.01); *B01J 20/3028* (2013.01); *B01J 20/3035* (2013.01); *B01J 20/3078* (2013.01); *B01J 20/3204* (2013.01); *B01J 20/3217* (2013.01); *B01J 20/3259* (2013.01); *B01J 20/3293* (2013.01); *B01J 31/0274* (2013.01); *C01B 33/18* (2013.01); *C09C 1/309* (2013.01); *C09C 1/3036* (2013.01); *C09C 1/3081* (2013.01); *C01P 2004/51* (2013.01); *C01P 2004/60* (2013.01); *C01P 2004/61* (2013.01); *C01P 2006/12* (2013.01); *C01P 2006/14* (2013.01); *C01P 2006/19* (2013.01); *C01P 2006/80* (2013.01); *C01P 2006/82* (2013.01)

(58) Field of Classification Search
CPC .......... B01J 20/3259; B01J 20/3078; B01J 20/3204; B01J 20/3217; B01J 20/3293; B01J 20/28004; B01J 20/103; B01J 20/2804; B01J 20/28057; B01J 20/28073; B01J 20/2808; B01J 20/28088; B01J 20/28076; B01J 20/28069; B01J 20/28011; B01J 20/28; B01J 20/30; B01J 20/32; B01J 31/0274; C01P 2004/60; C01P 2004/51; C01P 2004/61; C01P 2004/62; C01P 2006/12; C01P 2006/14; C01P 2006/19; C01P 2006/80; C01P 2006/82; C09C 1/3081; C09C 1/3036; C09C 1/309
See application file for complete search history.

(56) References Cited

U.S. PATENT DOCUMENTS

| | | | |
|---|---|---|---|
| 5,776,240 A * | 7/1998 | Deller | B01J 21/08 106/482 |
| 5,959,005 A | 9/1999 | Harlann et al. | |
| 6,316,050 B1 | 11/2001 | Troll et al. | |
| 7,285,330 B2 | 10/2007 | Meyer et al. | |
| 7,303,624 B2 | 12/2007 | Meyer et al. | |
| 7,402,293 B2 | 7/2008 | Meyer et al. | |
| 7,563,317 B2 | 7/2009 | Meyer et al. | |
| 7,713,626 B2 | 5/2010 | Meyer et al. | |
| 7,780,937 B2 | 8/2010 | Meyer et al. | |
| 7,815,936 B2 * | 10/2010 | Hasenzahl | A61K 31/00 424/452 |
| 7,972,431 B2 | 7/2011 | Meyer et al. | |
| 7,981,211 B2 * | 7/2011 | Meyer | B82Y 30/00 106/482 |
| 8,071,215 B2 | 12/2011 | Meyer et al. | |
| 8,152,916 B2 | 4/2012 | Meyer et al. | |
| 8,163,080 B2 | 4/2012 | Meyer et al. | |
| 8,211,971 B2 | 7/2012 | Meyer et al. | |
| 8,507,033 B2 | 8/2013 | Meyer et al. | |
| 8,512,595 B2 | 8/2013 | Meyer et al. | |
| 8,552,107 B2 | 10/2013 | Meyer et al. | |
| 2005/0103231 A1 | 5/2005 | Geisselmann et al. | |
| 2008/0213591 A1 | 9/2008 | Meyer et al. | |
| 2009/0050557 A1 * | 2/2009 | Bouchara | A24D 3/166 210/500.1 |
| 2009/0292097 A1 * | 11/2009 | Scholz | B82Y 30/00 528/38 |
| 2010/0151038 A1 * | 6/2010 | Cabelka | A61K 9/1652 424/499 |
| 2010/0233059 A1 * | 9/2010 | Meyer | B82Y 30/00 423/335 |
| 2012/0152151 A1 | 6/2012 | Meyer et al. | |
| 2012/0322893 A1 * | 12/2012 | Drexel | B01J 20/103 514/770 |

FOREIGN PATENT DOCUMENTS

| | | | |
|---|---|---|---|
| EP | 1700824 | 9/2006 | |
| TW | 201206827 | 2/2012 | |
| WO | 2006094876 | 9/2006 | |
| WO | 2011117100 | 9/2011 | |
| WO | WO-2011117100 A1 * | 9/2011 | ............ B01J 20/103 |

OTHER PUBLICATIONS

International Preliminary Report on Patentability and Written Opinion for Application No. PCT/EP2013/062166 dated Jan. 8, 2015 (17 pages—including English translation).
English Translation of Taiwan Patent Office Action for Application No. 102122526 dated Dec. 8, 2016 (8 pages).
Wu et al., "Surface properties of submicrometer silica spheres modified with aminopropyltriethoxysilane and phenyltriethoxysilane," Journal of colloid and interface science. 2006; 304(1):119-24.
Summary of Chinese Patent Office action for Chinese Patent Application No. 201380040161.7 dated Jan. 6, 2016 (4 pgs).

* cited by examiner

GRANULAR FUNCTIONALIZED SILICA, PROCESS FOR PREPARATION THEREOF AND USE THEREOF

CROSS-REFERENCE TO RELATED APPLICATIONS

This patent application is a national stage filing under 35 U.S.C. 371 of International Application No. PCT/EP2013/062166, filed Jun. 12, 2013, which claims the benefit of priority to German Patent Application No. 102012211121.2, filed Jun. 28, 2012, the entire contents of each of which are hereby incorporated by reference.

The present invention relates to granular functionalized silicas, to the production thereof and to the use thereof.

In many fields of application, for example in the sector of products for crop protection, in the case of active pharmaceutical ingredients, in the production of animal feeds and animal feed additives or in the foods industry, carrier materials are used to convert, for example, liquid or resinous active ingredients to a free-flowing and storage-stable form. This is described, for example, in WO 2011/117100.

A significant demand on the carrier material is a sufficiently high absorptivity, such that as little as possible carrier material need be used. A series of publications, for example DE 102006002765, is therefore concerned with processes for enhancing the content of absorbed material on the carrier material. However, the performance of these processes is very complex and they have not become established on the industrial scale to date.

A further demand on the carrier material is that the absorbates have good free flow and hence good processibility. In addition, the silicas should have a minimum level of dusting in the course of transport, dispensing and production of the absorbates. To improve the free flow, EP 0984772 A1 and EP 0966207 A1, for example, therefore propose using microgranular silicas with approximately spherical shape and with a mean particle size of more than 150 μm as carrier material. The absorbates obtained in this way do have improved free flow, but the processing properties of the silicas are not optimal.

In the field of fixed bed catalysis, there are further additional demands on the carrier or support material. For example, it has to be ensured that reactions in fixed bed reactors in which the reactants flow through a reaction chamber filled with laden support materials to which a catalyst has been applied give rise to minimum pressure drops in the reaction chamber. In the case of reactions in which a catalyst-laden support material is suspended in a reaction medium, the support material has to be removable again readily at the end of the reaction. Finally, reactions in a fluidized bed reactor require that the laden support materials can be fluidized efficiently therein. It is thus obvious that different reactor types place quite different demands on the laden supports and hence also on the support material. In order to meet these demands, WO 2011/117100 describes granular silicas having an Hg pore volume (<4 μm) of more than 0.90 ml/g, a $d_{Q3=10\%}$ of more than 400 μm with, at the same time, a $d_{Q3=90\%}$ of less than 3000 μm and a ratio of $d_{50}$ without ultrasound exposure to $d_{50}$ after 3 min of ultrasound exposure of <4.00, the measurement being effected on a fraction of particles of 400 to 500 μm. However, these silicas have the disadvantage that some catalytically active components, for example enzymes or biocatalysts, are bound only inadequately on the silica surface and are desorbed again too rapidly.

BRIEF DESCRIPTION OF THE DRAWINGS

Embodiments of the present invention will now be described, by way of example only, with reference to the accompanying drawings in which.

Figure 1:
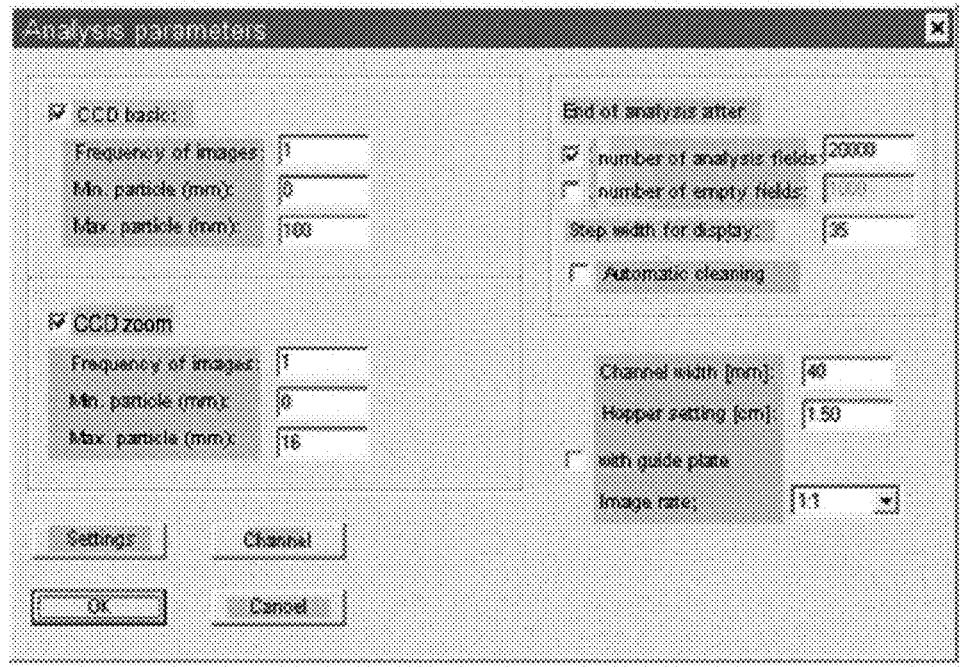
FIG. 1 shows the parameters for the analysis of dQ3=10% and dQ3=90%.

EP 1357156 A2 discloses silane-modified oxidic or silicatic fillers having a bead fraction smaller than 75 μm of less than 15% by weight and a median particle size between 130 and 500 μm.

Moreover, US 20060084746 discloses hydrophobic inorganic oxides selected from the group consisting of amorphous precipitated silica, alumina and mixtures of such inorganic oxides, wherein the hydroxyl content is 2-15 $OH/nm^2$, the carbon content 0.1 to 6% by weight, the methanol wettability 15 to 45% and the M1 Standard White Area less than 0.4%.

It is an object of the present invention to provide silicas which have improved desorption characteristics, for example of enzymes.

The invention provides a granular functionalized silica, which is characterized in that the Hg pore volume (<4 μm) is more than 0.80 ml/g, preferably more than 0.85 ml/g, more preferably more than 0.90 ml/g, even more preferably more than 0.95 ml/g, especially preferably more than 1.00 ml/g, $d_{Q3=10\%}$ is more than 400 μm, $d_{Q3=90\%}$ is less than 3000 μm, the ratio of $d_{50}$ without ultrasound exposure to $d_{50}$ after 3 min of ultrasound exposure is less than 4.00, preferably less than 3.00, more preferably less than 2.60, even more preferably less than 2.10 and especially preferably less than 1.60, the measurement being effected on a fraction of particles of 400 to 500 μm, and the carbon content is 1.0-15.0% by weight, preferably 2.0-14.0% by weight, more preferably 3.0-12.0% by weight.

The inventive granular functionalized silicas may have a pH of 5.0 to 11.0.

A sufficiently high porosity ensures that the inventive granular functionalized silicas have a sufficient pore volume in the meso- and/or macropore range, and hence that the enzyme has good accessibility for the reactants and, at the same time, a minimum amount of support material is required for production of the inventive formulations.

Further preferred inventive granular functionalized silicas have an Hg pore volume (<4 μm) of 0.81 to 1.50 ml/g, more preferably of 0.81 ml/g to 1.40 ml/g, most preferably of 0.81 ml/g to 1.30 ml/g.

A further important property of the inventive granular functionalized silicas is the hardness thereof. If the porosity is high, it may be the case that mechanical stability is no longer ensured, which can result in increased formation of fines under mechanical stress on the silica and on the formulations produced therewith. The mechanical stresses in the course of packing and transport of the silica, in the course of production of the formulations, and in the course of use of the laden support materials, are simulated by the action of ultrasound waves on the silica suspended in water for 3 min. The ratio of $d_{50}$ without ultrasound exposure to $d_{50}$ after 3 min of ultrasound exposure gives information as to how much the $d_{50}$ has been reduced by the mechanical stress. The harder the silica, the smaller the difference between $d_{50U}$ after ultrasound exposure and $d_{50}$ without ultrasound exposure, i.e., in the ideal case, the ratio of $d_{50}$ without ultrasound exposure to $d_{50U}$ after 3 min of ultrasound exposure would be 1.00.

The inventive granular functionalized silicas have very good hardness in spite of their high mean particle size.

The ratio of $d_{50U}$ without ultrasound exposure to $d_{50}$ after 3 min of ultrasound exposure may preferably be 1.00 to 3.00, more preferably 1.00 to 2.60, even more preferably 1.00 to 2.10, especially preferably 1.00 to 1.60. This measurement is effected on a fraction of particles of 400 µm-500 µm.

The particle size distribution—characterized by $d_{Q3=10\%}$ and $d_{Q3=90\%}$—is important to ensure good flow properties in fixed bed reactors or to ensure good fluidization properties in fluidized bed reactors. Excessively large particles do not have sufficient specific surface area for the reaction, dissolution and diffusion. Excessively small particles in turn increase the flow resistance. The inventive granular functionalized silicas therefore have a $d_{Q3=10\%}$ of >400 µm and $d_{Q3=90\%}$<3000 µm.

The inventive granular functionalized silicas may preferably have a carbon content of 1.0-9.0, preferably 1.0-7.5, more preferably 2.0-7.5.

The inventive granular functionalized silicas may have the functional groups $Si[(CH_2)_m—R']$, $(R'')_xSi[(CH_2)_m—R']$, $Si[(CH_2)_m—R']$, $(R'')_xSi[(CH_2)_m—R']$, $Si[(CH_2)_m—OOC(CH_3)C=CH_2]$, $Si[(CH_2)_m—OOC(CH_3)C=CH_2]$, $(R'')_{(3-x)}Si[(CH_2)_m—OOC(CH_3)C=CH_2]$ or $(R'')_xSi[(CH_2)_m—OOC(CH_3)C=CH_2]$, where m=0, 1-20,
R'=—NH_2, —NH—CH_2—CH_2—NH_2, —N—(CH_2—CH_2—NH_2)_2, —NH—CO—N—CO—(CH_2)_5, —NH—COO—CH, —NH—COO—CH_2—CH_3, —NH—(CH_2)_3Si(OR)_3—NH—(CH_2)_3—CH_3 or —NH—CH_2—CH_2—NH—CH_2—CH_2—NH_2,
R''=alkyl, cycloalkyl,
x=1 or 2.

The functional groups may be joined to the silica via Si—O—Si bonds:
$(—O—)_3Si[(CH_2)_m—R']$, $(—O—)_{(3-x)}(R'')_xSi[(CH_2)_m—R']$, $(—O—)_3Si[(CH_2)_m—R']$, $(—O—)_{3-x}(R'')_xSi[(CH_2)_m—R']$, $(—O—)_3Si[(CH_2)_m—OOC(CH_3)C=CH_2]$, $(—O—)_3Si[(CH_2)_m—OOC(CH_3)C=CH_2]$, $(—O—)_x(R'')_{(3-x)}Si[(CH_2)_m—OOC(CH_3)C=CH_2]$ or $(—O—)_{3-x}(R'')_xSi[(CH_2)_m—OOC(CH_3)C=CH_2]$.

The granular functionalized silica may be a fumed or precipitated silica.

The present invention further provides a first process for producing the inventive granular silicas, comprising the steps of a) providing a precipitated or fumed silica having a mean particle size $d_{50}$ without ultrasound treatment of 0.1 to 350 µm, preferably a BET surface area of 30 to 800 m²/g and preferably a DBP number of 140 to 400 g/100 g, b) moistening the silica from step a) to a drying loss of 30-80% by weight, c) shaping the silica from step b) by extrusion, granulation, compaction or tabletting, d) drying the shaped silica bodies in a drying unit, e) screen granulation or screening of the granules at a screen size of 3000 µm and screening off the fines with a screen mesh size of 400 µm, and f) reacting the granules from step e) with a surface modifier.

The precipitated or fumed silica from step a) may be dried and optionally ground.

Alternatively to the above-described first process according to the invention, it is also possible to use a water-containing filtercake with a drying loss of 30-80% by weight as the starting material for step a).

The present invention further provides a second process for producing the inventive granular silicas, comprising the steps of i) providing a precipitated or fumed silica having a drying loss <30% by weight and having a mean particle size $d_{50}$ without ultrasound treatment of 0.1 to 350 µm, preferably a BET surface area of 30 to 800 m²/g and preferably a DBP number of 140 to 400 g/100 g;

ii) shaping the silica from step i) by dry compaction, preferably between two rotating rollers, at a specific contact pressure of 0.5 kN/cm of roller width to 12 kN/cm of roller width to give slugs, iii) screen granulation or screening of the slugs at a screen size of 3000 µm and screening off the fines with a screen mesh size of 400 µm, and iv) reacting the granules from step iii) with a surface modifier.

The precipitated or fumed silica from step i) may be dried and optionally ground.

In all processes according to the invention described above, the hardness of the particles can be increased further by subjecting them to a treatment with water vapour at elevated temperature, for example 70° C. to 400° C. Thereafter, a further drying step may possibly be necessary.

In addition, the hardness of the particles can be increased by contacting them with an alkaline substance for a certain time in order to raise the pH of the particles. The process is described in DE 102008035867 A1.

In addition, the hardness of the particles can be increased by calcining the particles from process step e) or iii) at an elevated temperature, preferably between 700° C. and 1200° C., for a certain time, preferably <1 h.

The above-described process steps for hardening the particles can be performed before or after the process step of screen granulation and screening.

The moistening process step (b) and/or granulation process step (c) from the first process according to the invention can be performed in a high-speed intensive mixer, kneader, compactor, pan granulator and/or perforated die press or the like. Alternatively, the moistening may be followed by an extrusion, or a water-containing filtercake can be extruded directly. Extruded shaped bodies can subsequently be altered in geometric shape by further suitable processes (e.g. spheronizer from Caleva).

The drying process step (d) from the first process according to the invention can be performed, for example, in drying cabinets, fluidized bed dryers, belt dryers or the like. If necessary, the dried shaped bodies can subsequently be adjusted to the appropriate particle size fraction by further processes, for example screening or screen granulation at a screen size of 3000 µm, and screening off the fines with a screen mesh size of 400 µm.

The shaping step (ii) from the second process according to the invention is preferably performed in a compactor, for example in an apparatus from Hosokawa Bepex GmbH, such as Bepex L200/50, or Alexanderwerk AG.

The screen granulation (e or iii) from both processes according to the invention can preferably be performed in apparatuses such as a screen mill from Frewitt or Hosokawa Bepex GmbH. The screening can be effected by means of all known techniques, preferably by means of a vibrating screen from companies such as Vibra, Engelsmann or Allgeier. It is possible to perform several screens or several screening steps.

The reaction of the granules in step f) or iv) can be performed by spraying the silicas optionally first with water and then with the surface modifier. The water used may be acidified with an acid, for example hydrochloric acid, down to a pH of 7 to 1, or the water used may be alkalized with an alkali up to a pH of 7-14. If a plurality of surface modifiers are used, they can be applied together, but separately, successively or as a mixture. The surface modifier(s) may be dissolved in a suitable solvent. The end of the spraying may be followed by mixing for another 5 to 30 min.

The mixture can subsequently be treated thermally at a temperature of 20 to 400° C. over a period of 0.1 to 6 h. The thermal treatment can be effected under protective gas, for example nitrogen. The thermal treatment can also be effected in more than one stage at different temperatures.

The application of the surface modifier(s) and the thermal treatment can be effected in a suitable unit or separately in different suitable units.

The application of the surface modifier(s) can be effected with one-phase, two-phase or ultrasound nozzles.

The surface modification can be performed continuously or batchwise in heatable mixers and dryers with spray devices.

Suitable apparatuses may, for example, be ploughshare mixers, pan dryers, fluidized bed dryers or moving bed dryers.

The surface modifiers used may be organosilanes, for example a) organosilanes of the formula $(RO)_3Si(CH_2)_m$—R' where
R=alkyl, preferably methyl, ethyl or propyl,
m=0, 1-20,
R' = —$NH_2$, —NH—$CH_2$—$CH_2$—$NH_2$, —N—($CH_2$—$CH_2$—$NH_2)_2$, —NH—CO—N—CO—$(CH_2)_5$, —NH—COO—$CH_3$, —NH—COO—$CH_2$—$CH_3$, —NH—$(CH_2)_3Si(OR)_3$, —NH—$(CH_2)_3$—$CH_3$ or —NH—$CH_2$—$CH_2$—NH—$CH_2$—$CH_2$—$NH_2$, b) organosilanes of the formula $(R'')_x(RO)_{(3-x)}Si(CH_2)_m$—R' where
R, R' and m are each as defined above and
R''=alkyl, cycloalkyl,
x=1 or 2, c) haloorganosilanes of the formula $X_3Si(CH_2)_m$—R' where
R' and m are each as defined above and
X=Cl or Br, d) haloorganosilanes of the formula $(R'')_xX_{(3-x)}Si(CH_2)_m$—R' where R', R'', X, x and m are each as defined above, e) organosilanes of the formula $(RO)_3Si(CH_2)_m$—O(O)C$(CH_3)$C=$CH_2$
where R and m are each as defined above, f) haloorganosilanes of the formula $X_3Si(CH_2)_m$—O(O)C$(CH_3)$C=$CH_2$ where X and m are each as defined above, g) organosilanes of the formula $X_x(R'')_{(3-x)}Si(CH_2)_m$—O(O)C$(CH_3)$C=$CH_2$ where X, R'', x and m are each as defined above, h) organosilanes of the formula $(R'')_x(RO)_{(3-x)}Si(CH_2)_m$—O(O)C$(CH_3)$C=$CH_2$ where R, R'', x and m are each as defined above, and mixtures of these surface modifiers.

Preferably, the surface modifiers used may be aminopropyltriethoxysilane, aminopropyltrimethoxysilane, N-(2-aminoethyl)-3-aminopropylmethyldimethoxysilane, 3-aminopropylmethyldiethoxysilane or 3-methacryloyloxypropyltrimethoxysilane. More preferably, the surface modifiers used may be aminopropyltriethoxysilane, aminopropyltrimethoxysilane or 3-methacryloyloxypropyltrimethoxysilane.

For carrier or support applications, a number of silicas on the market can be used in the process according to the invention. Examples thereof are the silicas SIPERNAT® 50, SIPERNAT® 505, SIPERNAT® 500LS, SIPERNAT® 22, SIPERNAT® 22S, SIPERNAT® 22 LS and SIPERNAT® 33 from Evonik Industries. These silicas are—even though developed specifically for carrier or support applications—themselves unsuitable or suitable only to an insufficient degree for use as a carrier or support material. The causes of this—specifically in the case of the spray-dried, nozzle tower-dried and/or ground particles—are the excessively low particle size thereof, which, as outlined above, can lead to an undesired pressure rise in the reactor, and the absence of functional groups for chemical or physical attachment. By virtue of the process according to the invention, compaction of these silicas is undertaken, the particle size and the strength of the particles obtained thereby being controlled by the process according to the invention such that particles with an optimum particle size distribution and hardness are obtained, which have a low flow resistance in the reactor or can easily be filtered out of suspensions.

In addition to the silicas already mentioned, in step a) of the first process according to the invention, it is possible to use, for example, the silicas SIPERNAT® 2200, Aerosil® 200 from Evonik Industries, Tixosil® 38 A to X from Rhodia Chimie, HiSil® SC 60 and HiSil® SC 72 from PPG, Hubersil® 5170 from Huber, and the silicas disclosed in European Patents EP 0984772 A1, EP 0966207 A1 and EP 0937755 A1.

The silicas used in the process according to the invention may have
1. a mean particle size $d_{50}$ without ultrasound treatment of 0.1 to 350 µm, preferably of 0.1 to 200 µm, more preferably of 0.1 to 150 µm and most preferably of 1 to 50 µm,
2. a BET surface area of 30 to 800 $m^2/g$, preferably of 40 to 700 $m^2/g$, more preferably of 50 to 600 $m^2/g$, most preferably of 150 to 550 $m^2/g$,
3. a DBP number of 140 to 400 g/(100 g), preferably of 140 to 350 g/(100 g), more preferably of 190 to 350 g/(100 g), most preferably of 290 to 350 g/(100 g).

The first process according to the invention is preferably performed in a mixer, kneader or compactor (optionally with downstream extruder) and downstream dryer, screen granulator and screen. For example, the initially charged silica can first be wetted with liquid, for example in an apparatus from Eirich GmbH (unless filtercake is used directly), then compressed or compacted, then extruded and dried. The liquid-wetted and compressed or compacted silica can likewise be dried, then a screen granulation can be performed and then it can be screened to the desired particle fraction.

The hardness of the final carrier or support particles can be controlled by the measure of compression or compaction of the starting silica. The compaction can generally be effected by the addition of water with simultaneous introduction of shear energy. In addition, it is also possible to add aqueous solutions such as cellulose solutions or oils, which are suitable for functioning as binders between the particles. The liquid can, based on a density of 1.00 g/ml, preferably be added in proportions of 50 to 90% by weight, more preferably in proportions of 60 to 90% by weight and most preferably in proportions of 65 to 90% by weight. In addition, during the compaction, it is possible to add a solid which is suitable for functioning as a binder between the particles, for example cellulose, waxes or polymers, or monomers which are subsequently polymerized. The solid can be added in proportions of 0.1 to 50% by weight, preferably in proportions of 0.5 to 15% by weight, more preferably in proportions between 0.5 and 8% by weight.

In a preferred embodiment, the carrier or support materials can be compressed or compacted without the addition of binders (step c) or ii)).

The compaction can preferably be performed at a temperature of 10° C. to 90° C., more preferably of 10° C. to 70° C.

The shaping in the first process according to the invention can preferably be effected by intensively compacting the starting silica in the mixing unit with the aid of the liquid added until there is partial discharge of liquid, and granulation of the particles sets in. The particle size of the granules thus obtained (raw granules) can be homogenized by an extrusion step, and they can then be dried. In addition, the moist raw granules, on omission of the extrusion step, can also be dried directly and, for example, passed through a screen having a characteristic size of 3000 μm, which comminutes the particles larger than the characteristic screen size. The passage is effected preferably in apparatuses such as a screen mill from Frewitt or Hosokawa Bepex GmbH. Particles larger than the characteristic size of the passage screen can, in the case of use of the inventive support materials in the field of suspension catalysis, lead to the undesired sedimentation of the formulations and result in long diffusion or reaction times. It is additionally advantageous when all screen fractions smaller than 400 μm are removed. As described above, these small particles have an adverse effect on the flow resistance of the particles and lead to pressure drops in fixed bed reactors.

The screening can be effected by means of all known techniques, preferably by means of a vibrating screen from companies such as Vibra, Engelsmann or Allgeier. It is possible to perform several screens or several screening steps.

In the second process according to the invention, the compaction of the silica is preferably performed in a dry compactor with downstream screen granulator and screen. The initial charge of silica can be compacted, for example in an apparatus from Hosokawa Bepex GmbH such as Bepex L200/50 or from Alexanderwerk AG, and the compacted material can be screen-granulated and fractionated to the desired particle fraction.

In step ii) of the second process according to the invention, the dry starting silica is compacted, i.e. pressed to slugs, which have a particle size and hardness optimized for the inventive application. The hardness can be controlled by the pressure with which the starting silicas are compacted. The compaction is effected preferably at a specific contact pressure of 0.5 to 15 kN/cm of roller width, more preferably of 3 to 12 kN/cm of roller width and most preferably of 6 to 10 kN/cm of roller width, and at a temperature of 10° C. to 90° C., more preferably of 10° C. to 70° C. In addition, during the compaction, it is possible to add a liquid, preferably water, aqueous solutions such as cellulose solutions, or oils, which are suitable for functioning as a binder between the particles. The liquid can preferably be added in proportions of 1 to 30% by weight, more preferably in proportions of 1 to 20% by weight and most preferably in proportions of 3 to 15% by weight. In addition, during the compaction, it is possible to add a solid which is suitable for functioning as a binder between the particles, for example cellulose, waxes or polymers, or monomers which are subsequently polymerized. The solid is added in proportions of 0.1 to 50% by weight, preferably in proportions of 0.5 to 15% by weight, more preferably in proportions between 0.5 and 8% by weight.

This dry compaction can preferably be effected in such a way that the dry starting silica is pressed in a compaction unit between two rotating rollers, at least one roller more preferably having recesses such as grooves, depressions or cushions, the characteristic dimensions of which are greater than those of the particles to be obtained. The rollers may be of straight or concave configuration. A further particularly preferred embodiment consists in using at least one perforated toothed wheel roller. In addition, it may be advantageous when at least one roller is configured such that a reduced pressure can be generated at the roller surface, by which the silica to be compacted is sucked onto the roller. The silica can be supplied to the compaction unit by means of all conveying means known to those skilled in the art, for example conveying screws, twin screws, etc.

After the compaction, the slugs obtained are passed through a screen having a characteristic size of 3000 μm, in the course of which the particles larger than the characteristic screen size are comminuted. The passage is effected preferably in apparatuses such as a screen mill from Frewitt or Hosokawa Bepex GmbH. The particles larger than the characteristic size of the passage screen can, in the case of use of the inventive support materials in the field of suspension catalysis, lead to the undesired sedimentation of the formulations and result in long diffusion or reaction times. In addition, the screen fraction smaller than 400 μm is removed. As described above, these small particles have an adverse effect on the flow resistance of a particle bed and lead to pressure drops in fixed bed reactors.

The possible steam treatment on the finished dried granules can be accomplished in all apparatuses suitable for this purpose, these being, for example, belt dryers, rotary dryers, drying cabinets, fluidized bed dryers, etc. The granules can be exposed to a temperature of 70° C.-400° C., preferably 80° C.-300° C., more preferably 90° C.-200° C. and most preferably 106° C.-180° C. The residence time at this temperature may be up to 16 h, preferably up to 12 h, more preferably up to 8 h, most preferably up to 4 h.

The possible calcination of the particles can be effected in different apparatus, for example calcining furnaces, belt or rotary tube calciners, or in flash or fluidized bed calciners. The granules can be exposed to temperatures of 700° C.-1200° C., preferably 800° C.-1200° C., more preferably 800° C.-1100° C. The residence time depends on the calcination temperature and the desired particle hardness. The residence time in the process may be 1 h, preferably 20 min, more preferably less than 10 min.

The invention further provides for the use of the inventive granular functionalized silicas as support material, preferably for enzymes.

Finally, the invention provides a formulation comprising at least one inventive granular functionalized silica and an additive.

The additive of the formation may be chemically or physically bound to the inventive granular functionalized silica.

The inventive granular functionalized silicas can be used to produce formulations, the additives preferably being hardening agents or initiators, crosslinking agents, catalysts, active pharmaceutical ingredients and excipients, active cosmetic ingredients and excipients, cleansing and/or care compositions, flavourings, aromas and fragrances, animal feeds or animal feed additives, for example amino acids, vitamins, minerals, foods or food additives, dyes and/or pigments, amino acids, oxidizing or bleaching agents, additives with microbicidal, especially fungicidal or bactericidal, action, chemicals for agriculture and forestry, and/or a concrete admixture. The additive may be an aqueous or nonaqueous liquid, for example an oil, a resin, a solution, a dispersion, a suspension, an emulsion, a wax, a polymer or a melt. The additive can subsequently be treated thermally, heat treated, or induced to crystallize, to solidify, to separate or to react. In addition, the additives can be dried beforehand or afterwards.

Additives in the sector of animal feeds and animal feed additives include, for example, vitamins, minerals, carboxylic acids, mineral acids, amino acids, fats, oils and aromas. These are more preferably formic acid, acetic acid, propionic acid, lactic acid, phosphoric acid, choline chloride solution, vitamin E acetate and plant extracts, for example tagetes extract.

Additives in the sector of agriculture and forestry include, for example, absorbed fertilizers, for example nitrate- and/or phosphate-containing fertilizers, crop protection compositions, pesticides, for example herbicides, fungicides or insecticides.

Additives in the sector of cosmetic products include, for example, oils such as essential oils, perfume oils, care oils, fragrance oils and silicone oils, active antibacterial, antiviral or fungicidal ingredients, disinfectant and antimicrobial substances, deodorants, antioxidants, biologically active substances and biogenic active ingredients, vitamins and vitamin complexes, enzymes and enzymatic systems such as amylases, cellulases, lipases and proteases, cosmetically active substances such as ingredients of cosmetics and personal hygiene products, washing- and cleaning-active substances such as surfactants of all kinds, washing- and/or cleaning-active inorganic and organic acids, soil-repellent and soil-release active ingredients, oxidants and bleaches, bleach activators, builders and cobuilders, antiredeposition additives, greying and discoloration inhibitors, active substances for colour protection, substances and additives for laundry care, optical brighteners, foam inhibitors, pH modifiers and pH buffer substances.

Additives in the sector of foods and food additives include, for example, absorbed aromas, food supplements, vitamins, minerals and amino acids.

Additives from active pharmaceutical ingredients include all kinds of active pharmaceutical ingredients, for example α-proteinase inhibitor, abacavir, abciximab, acarbose, acetylsalicylic acid, acyclovir, adenosine, albuterol, aldesleukin, alendronate, alfuzosin, alosetron, alprazolam, alteplase, ambroxol, amifostine, amiodarone, amisulpride, amlodipine, amoxycillin, amphetamine, amphotericin, ampicillin, amprenavir, anagrelide, anastrozole, ancrod, antihaemophilic factor, aprotinin, atenolol, atorvastatin, atropine, azelastine, azithromycin, azulene, barnidipine, beclomethasone, benazepril, benserazide, beraprost, betamethasone, betaxolol, bezafibrate, bicalutamide, bisabolol, bisoprolol, botulin toxin, brimonidine, bromazepam, bromocriptine, budesonide, bupivacaine, bupropion, buspirone, butorphanol, cabergoline, calcipotriene, calcitonin, calcitriol, camphor, candesartan, candesartan cilexetil, captopril, carbamazepine, carbidopa, carboplatin, carvedilol, cefaclor, cefadroxil, cefaxitin, cefazolin, cefdinir, cefepime, cefixime, cefmetazole, cefoperazone, cefotiam, cefoxpran, cefpodoxime, cefprozil, ceftazidime, ceftibuten, ceftriaxone, cefuroxime, celecoxib, celiprolol, cephalexin, cerivastatin, cetirizine, chloramphenicol, cilastatin, cilazapril, cimetidine, ciprofibrate, ciprofloxacin, cisapride, cisplatin, citalopram, clarithromycin, clavulanic acid, clindamycin, clomipramine, clonazepam, clonidine, clopidogrel, clotrimazole, clozapine, cromolyn, cyclophosphamide, cyclosporin, cyproterone, dalteparin, deferoxamine, desogestrel, dextroamphetamine, diazepam, diclofenac, didanosine, digitoxin, digoxin, dihydroergotamine, diltiazem, diphtheria protein, diphtheria toxoid, divalproex, dobutamine, docetaxel, dolasetron, donepezil, dornase-α, dorzolamide, doxazosin, doxifluridine, doxorubicin, dydrogesterone, ecabet, efavirenz, enalapril, enoxaparin, eperisone, epinastine, epirubicin, eptifibatide, erythropoietin-α, erythropoietin-β, etanercept, ethynyloestradiol, etodolac, etoposide, factor VIII, famciclovir, famotidine, faropenem, felodipine, fenofibrate, fenoldopam, fentanyl, fexofenadine, filgrastim, finasteride, flomoxef, fluconazole, fludarabine, flunisolide, flunitrazepam, fluoxetine, flutamide, fluticasone, fluvastatin, fluvoxamine, follitropin-α, follitropin-β, formoterol, fosinopril, furosemide, gabapentin, gadodiamide, ganciclovir, gatifloxacin, gemcitabine, gestodene, glatiramer, glibenclamide, glimepiride, glipizide, glyburide, goserelin, granisetron, griseofulvin, hepatitis B antigen, hyaluronic acid, hycosin, hydrochlorothiazide, hydrocodone, hydrocortisone, hydromorphone, hydroxychloroquine, hylan G-F 20, ibuprofen, ifosfamide, imidapril, imiglucerase, imipenem, immunoglobulin, indinavir, indomethacin, infliximab, insulin, insulin human, insulin lispro, insulin aspart, interferon-β, interferon-α, iodine-125, iodixanol, iohexol, iomeprol, iopromide, ioversol, ioxoprolene, ipratropium, ipriflavone, irbesartan, irinotecan, isosorbide, isotretinoin, isradipine, itraconazole, potassium chlorazepate, potassium chloride, ketorolac, ketotifen, whooping cough vaccine, clotting factor IX, lamivudine, lamotrigine, lansoprazole, latanoprost, leflunomide, lenograstim, letrozole, leuprolide, levodopa, levofloxacin, levonorgestrel, levothyroxine, lidocaine, linezolide, lisinopril, lopamidol, loracarbef, loratadine, lorazepam, losartan, lovastatin, lysine acetylsalicylic acid, manidipine, mecobalamin, medroxyprogesterone, megestrol, meloxicam, menatetrenone, meningococcus vaccine, menotropin, meropenem, mesalamine, metaxalone, metformin, methylphenidate, methylprednisolone, metoprolol, midazolam, milrinone, minocycline, mirtazapine, misoprostol, mitoxantrone, moclobemide, modafinil, mometasone, montelukast, morniflumate, morphium, moxifloxacin, mycophenolate, nabumetone, nadroparin, naproxen, naratriptan, nefazodone, nelfinavir, nevirapine, niacin, nicardipine, nicergoline, nifedipine, nilutamide, nilvadipine, nimodipine, nitroglycerin, nizatidine, norethindrone, norfloxacin, octreotide, olanzapine, omeprazole, ondansetron, orlistat, oseltamivir, oestradiol, oestrogens, oxaliplatin, oxaprozin, oxolinic acid, oxybutynin, paclitaxel, palivizumab, pamidronate, pancrelipase, panipenem, pantoprazole, paracetamol, paroxetine, pentoxifylline, pergolide, phenytoin, pioglitazone, piperacillin, piroxicam, pramipexole, pravastatin, prazosin, probucol, progesterone, propafenone, propofol, propoxyphene, prostaglandin, quetiapin, quinapril, rabeprazole, raloxifene, ramipril, ranitidine, repaglinide, reserpine, ribavirin, riluzole, risperidone, ritonavir, rituximab, rivastigmin, rizatriptan, rofecoxib, ropinirole, rosiglitazone, salmeterol, saquinavir, sargramostim, serrapeptase, sertraline, sevelamer, sibutramine, sildenafil, simvastatin, somatropin, sotalol, spironolactone, stavudine, sulbactam, sulfaethidole, sulfamethoxazole, sulfasalazine, sulpiride, sumatriptan, tacrolimus, tamoxifen, tamsulosin, tazobactam, teicoplanin, temocapril, temozolomide, tenecteplase, tenoxicam, teprenone, terazosin, terbinafine, terbutaline, tetanus toxoid, tetrabenazine, tetrazapam, thymol, tiagabine, tibolone, ticarcillin, ticlopidine, timolol, tirofiban, tizanidine, tobramycin, tocopheryl nicotinate, tolterodin, topiramate, topotecan, torasemide, tramadol, trandolapril, trastuzumab, triamcinolone, triazolam, trimebutine, trimethoprim, troglitazone, tropisetron, tulobuterol, unoprostone, urofollitropin, valacyclovir, valproic acid, valsartan, vancomycin, venlafaxine, verapamil, verteporfin, vigabatrin, vinorelbine, vinpocetine, voglibose, warfarin, zafirlukast, zaleplon, zanamivir, zidovudine, zolmitriptan, zolpidem, zopiclone and derivatives thereof. However, active pharmaceutical ingredients are also understood to mean other substances such as vitamins, provitamins, essential fatty acids, extracts of vegetable and animal origin, oils of vegetable and animal origin, vegetable medicament preparations and homeopathic preparations.

The inventive granular functionalized silicas in the formulations can especially be used as a carrier for animal feed additives, for example formic acid, propionic acid, lactic acid, phosphoric acid, choline chloride solution, vitamin E acetate or plant extracts, for example tagetes extract.

In addition, the inventive granular functionalized silicas in the formulations can be used as a carrier material for chemical products such as melamine resins, rubber additives, plastics additives, additives for construction chemicals or paint additives.

The inventive granular functionalized silicas in the formulations are most preferably used as support material for catalysts of all kinds. The catalysts may especially preferably be enzymes or a combination of different enzymes, for example enzymes from the class of the oxidoreductases, transferases, hydrolases, lipases, lysases, isomerases and ligases (according to EC (Enzyme Commission) number of the Nomenclature Committee of the International Union of Biochemistry and Molecular Biology). Enzyme variants which are produced, for example, by recombination techniques shall likewise be included in the term "enzyme".

To produce the formulations, the inventive granular functionalized silicas are contacted with at least one additive, such that the additive can penetrate into the pores of the silica. For this purpose, it is possible to employ all technologies known to those skilled in the art, for example spray application, dropwise application, saturation, impregnation, nozzle spraying, etc. The inventive granular functionalized silica is preferably initially charged in a solids mixing unit, for example kneader, paddle dryer, tumbling mixer, vertical mixer, paddle mixer, Schugi mixer, cement mixer, Gericke continuous mixer, Eirich mixer and/or silo mixer. The temperature in the mixing unit may, depending on the nature and composition of the substance to be absorbed, preferably be between 5 and 90° C., more preferably between 10 and 70° C. The pressure in the mixer may preferably be between 0.1 bar and 2 bar, more preferably between 0.5 bar and 1.2 bar.

The content of all additives in the formulation may be between 1 and 70% by weight, preferably between 5 and 65% by weight, more preferably between 5 and 60% by weight, most preferably between 5 and 20% by weight.

The inventive formulations may especially preferably be used as catalysts in fixed bed reactors, in the field of heterogeneous catalysis, in fluidized bed reactors and for reaction in suspensions.

The physicochemical data of the raw materials used and of the inventive granular silicas are determined by the following methods:

Determination of BET Surface Area

The specific nitrogen surface area (referred to hereinafter as BET surface area) of silica is determined to ISO 9277 as the multipoint surface area. The measuring instrument used is the TriStar 3000 surface area measuring instrument from Micromeritics. The BET surface area is typically determined within a partial pressure range of 0.05-0.20 of the saturation vapour pressure of liquid nitrogen. The sample is prepared by heating the sample at 160° C. under vacuum for one hour in the VacPrep 061 heating station from Micromeritics.

Determination of DBP Absorption

DBP absorption (DBP number), which is a measure of the absorptivity of the silica, is determined on the basis of the standard DIN 53601 as follows.

12.50 g of silica with moisture content 3-10% (if necessary, the moisture content is adjusted by drying at 105° C. in a drying cabinet) are introduced into the kneading chamber of the C absorptometer from Brabender. The measurement on the C absorptometer is effected with PC support using the software BRABENDER Automatic Oil Absorption System Version 1.1.2 with fixed damping of the measured torque curve.

In the case of filtercakes, they are dried before use down to a moisture content of ≤10% at 105° C. in a drying cabinet, and passed through a 3 mm screen and then through a 300 µm screen.

At a peripheral speed of the left-hand kneader paddle of 125 rpm, the Titronic Universal burette (from Schott) which forms part of the C absorptometer is used to add dibutyl phthalate dropwise to the kneading chamber at room temperature at a rate of 4 ml/min. The switch-off point at which the control software of the C absorptometer stops the kneader and DBP metering is defined at a torque of 0.6 Nm.

The following formula serves to calculate the DBP absorption [g/100 g]:

$$DBP = \frac{V*D*100}{E} * \frac{g}{100\ g} + K$$

where
DBP: DBP absorption [g/100 g]
V: DBP consumed [ml]
D: DBP density [g/ml] (1.047 g/ml at 20° C.)
E: Starting weight of silica [g]
K: Correction value according to moisture correction table [g/100 g]

The DBP absorption is defined for anhydrous dried silicas. In the case of use of undried silicas, the correction value K should be taken into account for the calculation of the DBP absorption. This value can be determined using the correction table below.

TABLE

Moisture correction table for dibutyl phthalate absorption (anhydrous)

| | .% Moisture | | | | |
|---|---|---|---|---|---|
| % Moisture | .0 | .2 | .4 | .6 | .8 |
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Example

If the moisture content of a silica is 5.8%, a correction value K of 33 g/100 g is added to the value analysed as described above for the DBP absorption. The moisture content of a silica is determined by the "determination of moisture content" method described later in the text.

Determination of Particle Size by Means of Laser Diffraction

The application of laser diffraction to determine particle size distributions of pulverulent solids is based on the phenomenon that particles scatter or diffract the light from a monochromatic laser beam in all directions with different intensity patterns according to their size. The smaller the diameter of the particle being irradiated, the larger the scattering or diffraction angles of the monochromatic laser beam.

Sample Preparation for Particle Size Measurement by Means of Laser Diffraction:

Since the size of some of the sample particles exceeds the measurement range of the instrument used and the ratio of $d_{50}$ without ultrasound exposure to $d_{50U}$ after 3 min of ultrasound exposure depends on the starting particle size (smaller particles of a material possess a higher ratio of the sizes described), the measurement is preceded by screening a particle fraction of 400 µm-500 µm out of the sample. This operation allows the stability of different materials to be compared reliably to obtain a statement about the substance-specific stability. The screening is effected with a HAVER EML 200 Digital Plus screening machine, from Haver & Boecker, 59302 Oelde, which is equipped with 400 µm and 500 µm screens. 5 g of the starting material are applied to the upper, 500 µm screen, and screened with an amplitude setting of 1.0 for 2 minutes. The particle fraction between 400 µm and 500 µm is used for the further analysis.

Should the 400 µm to 500 µm fraction, which is important for the comparison, not be part of the particle size distribution of the present carrier or support material, a corresponding screen fraction is produced by passing a sufficient amount of the starting material through a 500 µm screen at 100 oscillations/minute with the aid of a TG2S screen granulator from Eweka GmbH, Heusenstamm, and then screening it off through a 400 µm screen. The screening is accomplished as described above.

$d_{50}$ Determination without Ultrasound Exposure

In the case of hydrophilic silicas, the sample is prepared for the analysis (rinsing of the module, etc.) by means of the LS 230 laser diffraction system (from Beckman Coulter; measurement range 0.04-2000 µm) and liquid module (Small Volume Module Plus, 120 ml, from Beckman Coulter with integrated ultrasound finger) with the aid of 0.05% m/m tetrasodium diphosphate in demineralized water as dispersion liquid, and in the case of insufficiently water-wettable silicas with an ethanol/water mixture (volume ratio 1:1) as dispersion liquid.

Before the start of the analysis, the laser diffraction system has to warm up for 2 hours. Thereafter, the SVM module is rinsed three times with the dispersion liquid. The following parameters relevant for the particle analysis should be set:

Analysis time: 60 seconds
Number of measurements: 1
Pump speed: 75%
Optical model: Fraunhofer
PIDS function: deactivated
Offset measurement: activated
Adjustment: auto
Background measurement: activated
Set sample concentration: activated A spatula is used to add the silica screen fraction (400-500 µm) until the required measurement concentration for which the LS 230 laser diffractor gives the "OK" message is attained. After dispersing the silica suspension for 60 seconds by pumped circulation without ultrasound exposure, the analysis is effected at room temperature. From the raw data curve, the software calculates the particle size distribution and the $d_{50}$ without ultrasound exposure (median) on the basis of the Fraunhofer model (Fraunhofer.rfd file).

$d_{50U}$ Determination after 3 Minutes of Ultrasound Treatment at 100% Amplitude The silica suspension present in the LS 230 laser diffractor is dispersed again by ultrasound treatment for 180 seconds by means of the ultrasound finger integrated in the SVM module (Vibra Cell VCX 130 ultrasound processor from Sonics with CV 181 ultrasound converter and 6 mm ultrasound tip) at 100% amplitude with simultaneous pumped circulation in the liquid module, and analysed as described above.

From the raw data curve, the software calculates the particle size distribution and the $d_{50U}$ after 3 minutes of ultrasound exposure (median) on the basis of the Fraunhofer model (Fraunhofer.rfd file).

Determination of Particle Size by Means of Dynamic Image Evaluation

In dynamic image evaluation, a stream of bulk material falls downwards between a light source and a camera. The particles are detected as a projection area, digitalized and converted to a particle size with a computer program.

Determination of dQ3=10% and dQ3=90%

To measure the particle size, the CAMSIZER from RETSCH Technology GmbH, Haan is used. The particles are supplied to the measuring instrument with the aid of the DR 100-40 metering channel with reservoir funnel. For the image evaluation, the software supplied in version 3.12d should be used.

Before the start of the analysis, the instrument is allowed to warm up for 2 h. It is ensured that glass guards in front of the illumination unit and the camera are free of dust. The distance between funnel and metering channel is adjusted to about three times the maximum particle size. The metering channel is placed directly above the measuring instrument. About 150 ml of sample are introduced into the funnel. The parameters for the analysis are recorded in the analysis tasks file (*.afg), as shown in FIG. 1.

Figure 2:
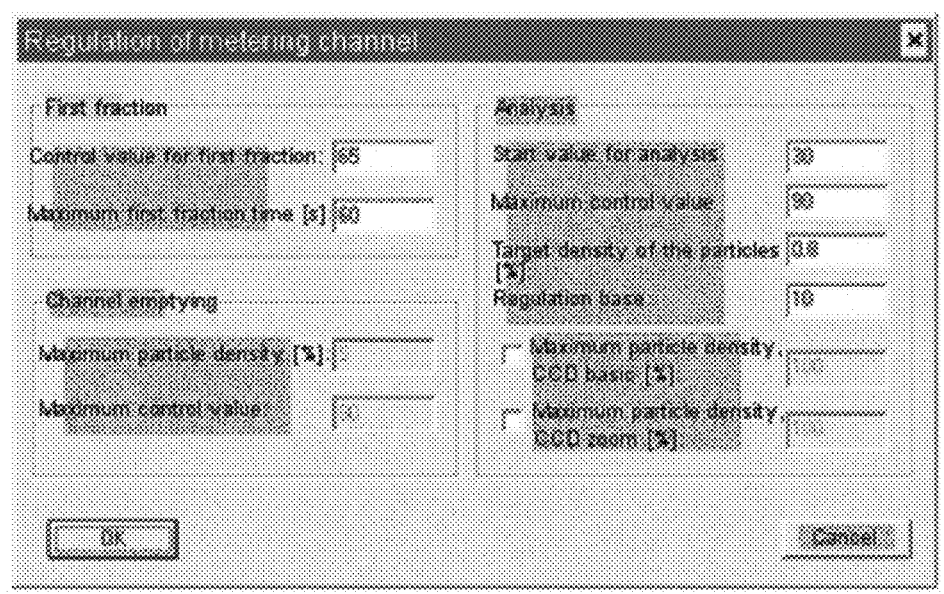
FIG. 2 shows the settings in the software to regulate the metering channel.

To regulate the metering channel, the settings shown in FIG. 2 are recorded in the software.

Figure 3:
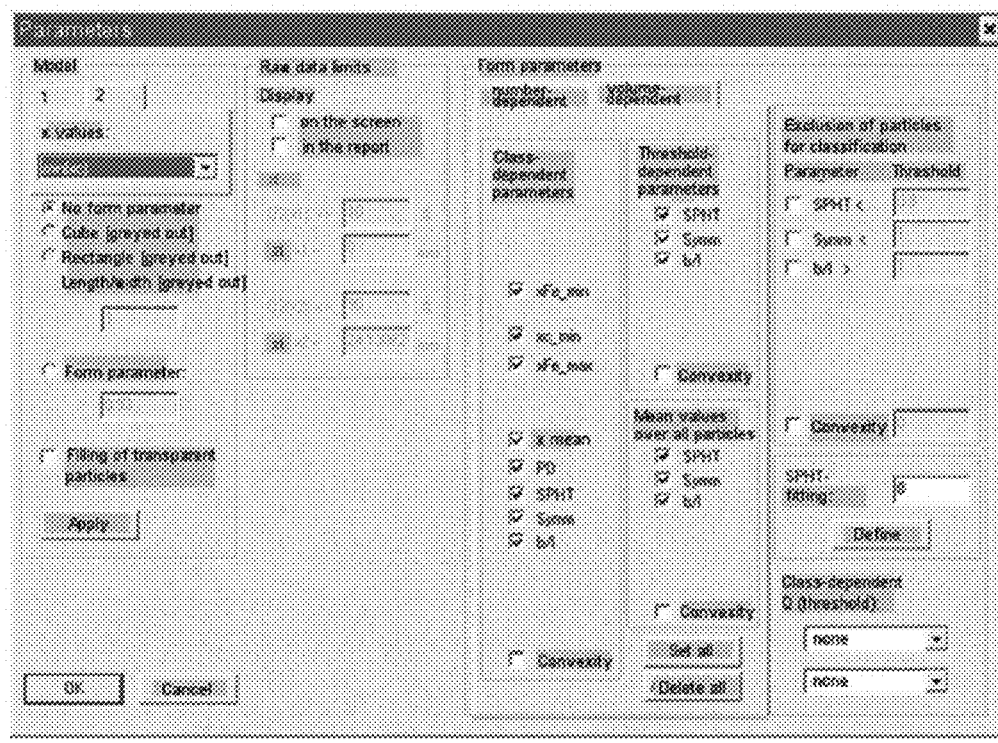
FIG. 3 shows the parameters for the evaluation of the digitalized images.

In the evaluation of the digitalized images, the x values are calculated from the min(xc) values, as shown in FIG. 3. No form factors are used.

Figure 4:
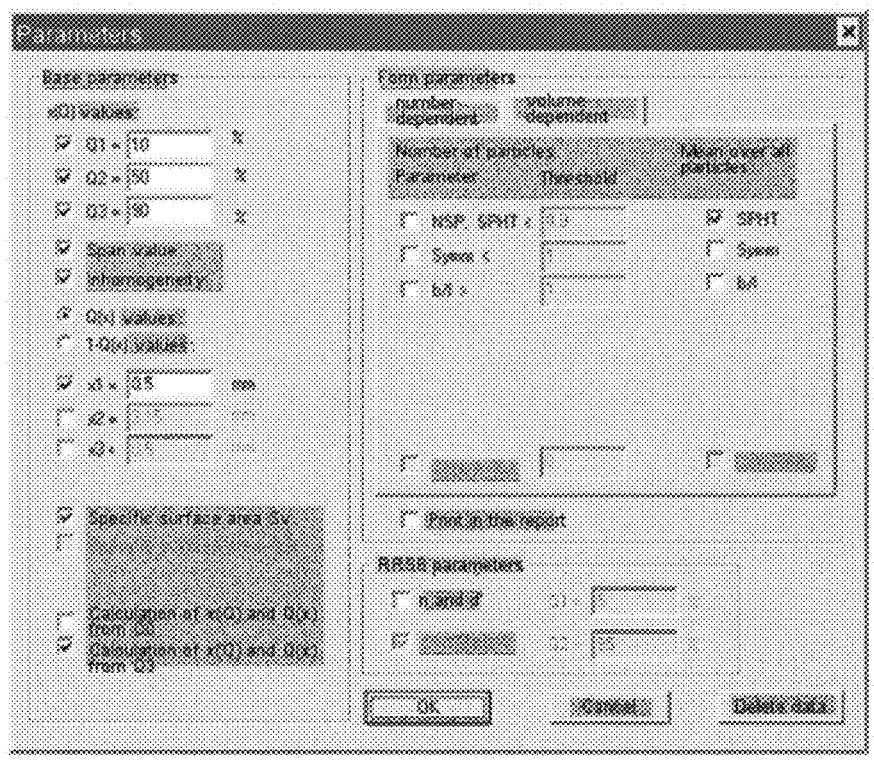
FIG. 4 shows the settings for the dQ3=10% and dQ3=90% output.

The output of the $d_{Q3=10\%}$ and of the $d_{Q3=90\%}$ is determined in the base parameters, as shown in FIG. 4.

No fitting of analysis data is undertaken with the aid of fitting files.

Determination of Moisture Content

The moisture content of silicas is determined to ISO 787-2. For this purpose, a sample amount of 1-4 g is dried in a drying cabinet at (105±2°) C for 2 hours and evaluated according to the ISO specifications. This drying loss consists predominantly of physically bound water.

Determination of pH of the Silica

The pH of the silica is determined as an aqueous suspension at room temperature. Granulated samples are ground with a mortar and pestle or crushed beforehand. 95 g of deionized water are added to 5 g of silica. The suspension is stirred by means of a magnetic stirrer for 5 minutes. Directly thereafter, with the aid of a pH meter calibrated in the expected measurement range (Metrohm 780 pH Meter), the pH of the suspension is measured accurately to one decimal place.

Determination of Mercury Pore Volume≤4 µm

The method is based on mercury intrusion to DIN 66133, using an AutoPore IV 9520 system from Micromeritics. The process principle is based on the measurement of the mercury volume injected into a porous solid as a function of the pressure applied. This covers only the pores into which mercury can penetrate at the pressure applied (max. 414 MPa) (Ritter and Drake method).

A non-wetting liquid penetrates into a porous system only under pressure. The pressure to be expended is inversely proportional to the clear width of the pore orifices. For cylindrical pores, the relationship between pore radius $r_p$ and pressure p is given by the Washburn equation:

$$r_p = -\frac{2 \times \sigma}{p} \times \cos\theta$$

$r_p$: pore radius
p: pressure
σ: surface tension (480 mN/m*)
θ: contact angle of mercury (140° *)
*to DIN 66133

The mercury pore volume≥4 µm is calculated from the cumulated pore volume of all pores having a diameter of ≤4 µm down to the detection limit of the AutoPore IV 9520 mercury porosimeter (maximum pressure 414 MPa).

The examples which follow are intended to illustrate the invention in detail, without restricting the scope thereof.

Determination of Carbon Content

The carbon content is determined by means of a LECO element analyser (model: CS 244 or CS 600). The oxide is weighed into a ceramic crucible, provided with combustion additives and heated in an induction oven under an oxygen stream. This oxidizes the carbon present to $CO_2$. This amount of gas is quantified by means of infrared detectors. Before the actual measurement, a calibration of the instrument is conducted with suitable reference material.

Procedure

About 50 to 150 mg of the sample material are weighed accurately to 1 mg into a ceramic crucible. The sample material is covered with about 1 g of Lecocel II (powder of a tungsten-tin (10%) alloy) and about 0.7 g of iron filings. Subsequently, the crucible is closed with a lid. The induction oven is set to maximum power and purged with oxygen for 10 s. After the crucible has then been inserted into the induction oven, the automatic measurement and evaluation is started. For each sample, multiple determinations are conducted. The result is reported in % by weight.

The carbon detection limit of this analytical method is 300 µg/g.

Determination of Tamped Density

Tamped density is determined to DIN EN ISO 787-11.

Determination of Ignition Loss

Ignition loss is determined on the basis of ISO 3262-1. Differences from ISO 3262-1 are that
rather than platinum dishes or porcelain dishes, porcelain crucibles or fusion crucibles are used for the determination,
about 0.5 g (500 mg) rather than about 2 g of the silica to be tested is weighed in,
the material to be examined is not dried beforehand; instead, the moisture correction is effected by a separate determination of the drying loss based on ISO 787-2.

EXAMPLES

Comparative Example 1

SIPERNAT® 50 S from Evonik Industries is mixed and compacted in a mixer (R02 from Eirich) with addition of 220 ml of water/100 g of silica. The 10 litre mixing vessel, equipped with the pin-type agitator mixing tool, is used at room temperature. In order to obtain an optimal fill level of the mixer, 1 kg of SIPERNAT® 50 S is initially charged. The water is added homogeneously at a peripheral speed of the agitator of 20 m/s within one minute. The plate is always running at level 1. Thereafter, the pin-type agitator is operated at 40 m/s. The process is stopped as soon as the desired agglomerate size has formed. The granules obtained are dried to constant weight at 160° C. in a drying cabinet, then fractionated by screening to 400-1250 µm. For test purposes, for individual tests, a 400-500 µm screen fraction is produced; it is used for the subsequent hardness and porosity testing.

Example 1 and 2

The granules from the Comparative Example are initially charged in a ploughshare mixer and sprayed by means of a two-phase nozzle (carrier gas: nitrogen) while being mixed with the surface modifier. The end of the spraying is followed by mixing for another 15 minutes.

The mixture is subsequently treated thermally in a drying cabinet (heat treatment).

The exact experimental parameters for production of Examples 1 and 2 are listed in Table 1 below.

TABLE 1

| Reference | Amount of granules from Comparative Example 1 [kg] | SM*/ amount [kg] | Parts of SM*/ 100 parts of granules | Heating temperature [° C.] | Heating time [h] |
|---|---|---|---|---|---|
| Example 1 | 4.8 | A/1.45 | 30 | 130 | 3 |
| Example 2 | 2.5 | B/0.875 | 35 | 130 | 3 |

*SM = surface modifier,
A = 3-aminopropyltriethoxysilane,
B = 3-methacryloyloxypropyltrimethoxysilane Tables 2a and 2b contain the physicochemical data of the inventive surface-modified silicas and comparative silica.

TABLE 2a

| Reference | Tamped density [g/l] | Drying loss [%] | Ignition loss [%] | Carbon content [%] | pH |
|---|---|---|---|---|---|
| Example 1 | 350 | 0.3 | 10.5 | 5.3 | 10.2 |
| Example 2 | 377 | 1.0 | 17.5 | 11.4 | 7.8 |
| Comparative Example 1 | 308 | 3.4 | 4.7 | <0.1 | 6.5 |

TABLE 2b

| Reference | D50 without ultrasound (d50$_{ous}$) [μm] | D50 after 3 min ultrasound (d50$_{us}$) [μm] | Ratio (d50$_{us}$/d50$_{ous}$) | Hg pore volume < 4 μm [ml/g] | dQ3 = 10% [μm] | dQ3 = 90% [μm] |
|---|---|---|---|---|---|---|
| Example 1 | 543.4 | 491.4 | 1.11 | 1.20 | 446 | 977 |
| Example 2 | 524.9 | 497.1 | 1.06 | 1.02 | 459 | 961 |
| Comparative Example 1 | 523.9 | 441.8 | 1.19 | 1.45 | 467 | 988 |

Desorption Test of Supports Laden with Silicone Oil

1. Production of the Formulations (Absorbates)

8 g of DOW DC 200 50cs silicone oil are weighed into a beaker, 10 g of granular silica (drying loss <=6%) are added and then mixed by means of a spatula until a dry and free-flowing absorbate is obtained. The absorbate thus obtained is stored at room temperature (23° C.) for 14 days.

Comparative formulation 1: 5 g of Comparative Example 1+4 g of DC200 50cs silicone oil Inventive Formulation 1: 5 g of Example 1+4 g of DC200 50cs silicone oil Inventive Formulation 2: 5 g of Example 2+4 g of DC200 50cs silicone oil 2. Determination of Desorption Propensity A surfactant solution is prepared by dissolving 10 g of Triton X160 in 490 g of demineralized water.

A 50 ml centrifuge tube is filled with 20 ml of surfactant solution, and 9 g of the formulation described in 1 are added.

The centrifuge tube is upturned 10 times and left to stand for 5 min.

The supernatant is decanted into a weighed glass dish through a 200 μm screen.

The amount of absorbates retained is dispersed again in 20 ml of surfactant solution, and the extractive shaking step is repeated a total of 5 times (5×20 ml of surfactant solution). The volumes of liquid decanted each time are collected in the glass dish.

The collected decanted surfactant solutions are left to dry at 110° C. for 3 h and the residue is weighed accurately.

As a blank (to determine the amount of residue without silicone oil), 5 g of Comparative Example 1 are dispersed in 100 ml of surfactant solution, then decanted and dried.

3. Result (Samples Stored at RT for 14 Days)

The percentage of silicone oil released is calculated as follows:

$$((\text{residue}-\text{blank})\times 100)/4 = \text{release}[\%]$$

Results

Blank: 1.409 g of residue

Comparative Example 1: 3.38 g of residue=>49.3% release

Example 1: 1.60 g of residue=>4.8% release

Example 2: 2.02 g of residue=>15.3% release

The inventive examples show much lower release and hence higher absorption.

The invention claimed is:

1. A granular functionalized silica comprising:
   a Hg pore volume (<4 μm) of more than 0.80 ml/g,
   $d_{Q3}$=10% of more than 400 μm,
   $d_{Q3}$=90% of less than 3000 μm,
   a ratio of $d_{50}$ without ultrasound exposure to $d_{50}$ after 3 min of ultrasound exposure is <4.00, a measurement being effected on a fraction of particles of 400 to 500 μm, and
   a carbon content of 1.0-15.0% by weight;
   wherein the granular functionalized silica is a precipitated silica, contains a surface modifier that is 3-aminopropyltriethoxysilane on a surface of the granular functionalized silica and contains an additive,
   wherein the additive is bound to the granular functionalized silica, and
   wherein the additive is released from the granular functionalized silica at least 10 times less with the surface modifier that is 3-aminopropyltriethoxysilane compared to the granular functionalized silica without the surface modifier.

2. The granular functionalized silica according to claim 1, wherein the granular functionalized silica has a pH in a range from 5.0 to 11.0.

3. The granular functionalized silica according to claim 1, wherein the granular functionalized silica has a ratio of $d_{50}$ without ultrasound exposure to $d_{50}$ after 3 min of ultrasound exposure of 1.00 to 3.00, a measurement being effected on a fraction of particles of 400 to 500 μm.

4. The granular functionalized silica according to claim 1, wherein the granular functionalized silica has the Hg pore volume (<4 μm) of 0.81 to 1.50 ml/g.

5. The granular functionalized silica according to claim 1, wherein the additive comprises hardening agents or initiators, crosslinking agents, catalysts, active pharmaceutical ingredients and excipients, active cosmetic ingredients and excipients, cleansing and/or care compositions, flavourings, aromas and fragrances, animal feeds or animal feed additives, vitamins, minerals, foods or food additives, dyes and/or pigments, amino acids, oxidizing or bleaching agents, additives with microbicidal action, chemicals for agriculture and forestry, and/or concrete admixtures.

6. The granular functionalized silica according to claim 1, wherein the additive is an enzyme.

* * * * *